(12) United States Patent
Kato

(10) Patent No.: US 6,749,057 B2
(45) Date of Patent: Jun. 15, 2004

(54) SEALING MEANS FOR SLIDING UNIT

(75) Inventor: Masataka Kato, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 38 days.

(21) Appl. No.: 10/283,178

(22) Filed: Oct. 30, 2002

(65) Prior Publication Data

US 2003/0098551 A1 May 29, 2003

(30) Foreign Application Priority Data

Nov. 26, 2001 (JP) ........................................ 2001-358901
Sep. 19, 2002 (JP) ........................................ 2002-273342

(51) Int. Cl.⁷ .............................................. B65G 25/00
(52) U.S. Cl. .................................. 198/750.7; 198/750.1
(58) Field of Search ......................... 198/750.1, 750.2, 198/750.3, 750.4, 750.7, 468.4, 468.01

(56) References Cited

U.S. PATENT DOCUMENTS

| | | | | |
|---|---|---|---|---|
| 5,211,279 A | * | 5/1993 | Abbestam et al. | 198/750.1 |
| 6,308,821 B1 | * | 10/2001 | Asai et al. | 198/750.7 |
| 6,662,934 B1 | * | 12/2003 | Iida | 198/750.1 |

FOREIGN PATENT DOCUMENTS

| | | |
|---|---|---|
| JP | 325070/1999 | 11/1999 |
| JP | 27235/2001 | 1/2001 |
| JP | 187906/2001 | 7/2001 |
| JP | 206530/2002 | 7/2002 |

* cited by examiner

Primary Examiner—James R. Bidwell
(74) Attorney, Agent, or Firm—Browdy and Neimark

(57) ABSTRACT

With a sealing structure for the sliding unit disclosed here, a sealing member of foam rubber is disposed in a way closing a clearance left open between widthwise opposing covering shells installed on a track rail. A covering shell is composed of a covering side secured to a side wall of a track rail, and seal supporters integral with the covering side. A slider is provided with a projection extending through between inside fronts of the sealing members, which come into abutment against one another. Upon the back-and-forward linear movement of the slider relatively to the track rail, the projection moves in a way deforming the sealing members in expansion/collapse fashion, with keeping the close sliding engagement with the confronting fronts of the sealing members so that the sealing members keep constantly closing the clearance left open between the covering shells.

21 Claims, 5 Drawing Sheets

SEALING MEANS FOR SLIDING UNIT

BACKGROUND OF THE INVENTION

1. Field of the Invention

The present invention relates to a sliding unit having a guide rail member and a slider fit in the guide member for back-and forth movement with respect to the guide member, and more particularly sealing means for the sliding unit to keep contaminants including debris, metal cuttings, oil mists and so on, which might occur owing to the back-and-forth movement of the slider, against escape outside the sliding units, and also isolate the sliding unit from foreign materials such as oil mists, dust and dirt which might otherwise enter into the sliding unit.

2. Description of the Prior Art

Sliding units constructed as shown in FIGS. 8 and 9 are conventionally known to work on a diversity of fields including semiconductor manufacturing apparatus, machine tools, various assembling equipments, testing instruments and so on, most of which is expected to work in controlled atmosphere as in a clean room. The prior sliding unit is primarily comprised of an elongated track rail 2 upward opened to have an U-shaped traverse cross-section, a slider 3B accommodated for lengthwise movement in an U-shaped recess 5 opened upward at 27 of the track rail 2, a recirculating-ball screw shaft 4 mating with the slider 3B, and a motor 9 for driving the recirculating-ball screw shaft 4 to turn about its own axis. The recirculating-ball screw shaft 4 is supported for rotation on the track rail 2 at both of a first bearing member 11 installed in an lengthwise end near the motor 9 and a second bearing member 12 installed in the lengthwise opposite end of the track rail 2, which is fastened to any basement by means of suitable fastener means such as screws. The slider 3B fits in the track rail 2 for linear movement through rolling elements running through between the slider 3B and the track rail 2. A bottom 6 and a pair of upright side walls 7A define in combination the recess 5 in the track rail 2. The side walls 7A are provided on their sidewise opposing inner surfaces with raceway grooves 8 while the slider 3B has raceway grooves confronting the raceway grooves 8 on the side walls 7A to define load raceways between them. Rolling elements may run through the load raceway defined between the raceway grooves 8 on the side walls 7A and the raceway grooves on the slider 3B, thereby allowing the slider 3B to move smoothly on the track rail 2.

The slider 3B has a pair of widthwise opposing flanges 13, which are angled upwards to rest thereon an object such as a workpiece table, not shown. The flanges 13 are made with threaded holes 14 for fixture means such as bolts to hold any object thereto. A dustproof cover 15B is attached to the forward and aft bearing members 11, 12 so as to shield the track rail 2 with the exception of sidewise clearances 33 where the flanges 13 are allowed to extend sidewise to move back and forth through there. Thus, the dustproof cover 15B is arranged above the slider 3B and the recirculating-ball screw shaft 4, which constitute in combination a torque-to-thrust conversion system for the sliding unit, thereby keeping the contaminants such as dust and debris against entering into and also coming from inside the track rail 2. The upright flanges 13 of the slider 3B, on which the object to be carried is loaded, extend widthwise outwardly of the tack rail 2 and then turn upwardly so as to be unobstructed with the dustproof cover 15B. The slider 3B has a nut 17 made therein with an internal helical groove that will mate with an external helical groove provided around the recirculating-ball screw shaft 4. The mating of the screw shaft 4 with the nut 17 constitutes a torque-to-thrust conversion system in which the rotation of the screw shaft 4 allows the nut 17 to move linearly lengthwise of the track rail 2. The forward and aft bearing members 11, 12 are mounted on railheads 20 of the upright side walls 7A of the track rail 2. The railheads 20 are finished in parallel with the raceway grooves 8 of the track rail 2.

Sensor rails 22 are disposed on sidewise outsides of the upright side walls 7A of the track rail 2, one to each side wall 7A. The sensor rails 22 are each provided with a limit sensor 23 at any preselected place to sense the associated flange 13 during back-and-forth movement, followed by issuing the detected signal to a controller through a lead wire 24 and a sensor connector 25. The motor 9 is energized depending on any control signal applied through a motor connector 28 to produce a torque transmitted to the recirculating-ball screw shaft 4 via a coupling 30. A fore-and-aft range over which the slider 3B is allowed to travel is defined with stoppers 31, 32 that are secured to the bearing member 11, 12, one to each bearing member.

In Japanese Patent Laid-Open No. 325070/1999, for example, there is disclosed a sealing construction for the sliding unit constructed as stated earlier, in which bellows-like sealing means are installed at the sidewise clearances 33 to keep foreign matter such as dust, debris and so on against entering into and coming from inside the sliding unit through the sidewise clearances 33. The bellows-like sealing means are each composed of at least one sealing member expansible owing to its own elasticity, which is secured to anyone of the confronting lengthwise edges of the upright side wall 7A of the track rail 2 and the dustproof cover 15B to close the associated clearance 33. When the slider 3B travels with respect to the track rail 2 along the clearances 33, the sealing members are easily subject to the elastic expansile and collapsed deformation and thus thrust aside by the action of the moving flanges 13.

Another example of the sealing constructions for the sliding unit made as stated earlier is disclosed in Japanese Patent Laid-Open No. 27235/2001, which is the senior application of the present applicant. With this prior sealing construction, the expansible sealing members are arranged in gaps between the track rail and the dustproof cover in a manner allowing the flanges to travel along the gaps as the slider moves relatively to the track rail. Each expansible sealing member is composed of upper and lower sealing parts that are urged elastically against each other to close the associated gap. When the flange travels along the associated gap, the upper and lower sealing parts are shoved apart from each other at only a region closely neighboring the moving flange to allow it to travel between the sealing parts, with keeping a sliding contact with the opposite surfaces of the moving flange. At the residual regions before and after the moving flange, however, the upper and lower sealing parts are kept in abutment against each other due to their own elasticity. The lower sealing part is made greater in elastic force than the upper sealing part to compensate the influence of gravity. Moreover, the upper and lower sealing parts are made in an elongated configuration that is attached at one lengthwise side thereof to any one edge of the gap and abutted against the counterpart with their own elasticity.

There are also known a conveying system with dust proofing means of the type disclosed in, for example, Japanese Patent Laid-Open No. 187906/2001. The conveying system is made of a rodless cylinder that includes a cylinder tube and a table moving in and out along the cylinder tube. A mounting stage is fastened to the table while a covering member is attached to the cylinder tube. A dustproof member is held between an inside surface of the covering member and any one of side surfaces of the cylinder tube and the mounting stage. The dustproof member may be subjected to elastic deformation in a sidewise direction that is perpendicular to a direction along which the table moves in and out.

With most prior sliding units constructed as stated earlier, nevertheless, any sidewise slits or clearances are left uncovered between the dustproof cover and the track rail to allow the flanges for supporting thereon a workpiece table to travel back and forward integrally with the slider along the clearances as the slider moves back and forth with respect to the track rail. This means many conventional sliding units should not be able to effectively prevent foreign materials such as dust and dirt, and so on from entering into the sliding unit through the clearances and also keep contaminants including debris, metal cuttings, and so on owing to the sliding unit itself against scattering all around through the clearances in the clean rooms where the semiconductor manufacturing machines and the like are installed. To cope with this, various ways constructed as stated earlier have been proposed to keep dust and debris against entering into and escape out of the dustproof cover through slits, clearances and so on. Nevertheless, the major obstacles to all the sealing constructions in which the bellows-like expansible sealing members are installed to close the sidewise clearances and in which the upper and lower expansible sealing parts are urged elastically against each other to close the clearances are necessitating the sophisticated expansible sealing members that are very tough to form them and thus become high in their production cost. Moreover, another problem faced in the expansible sealing members as stated above is how to make sure of more elasticity, with even superior sealing property.

To better deal with the obstacles and problem as stated above, the sealing member as shown in FIG. 7 has been developed, which has been filed by the present applicant under senior patent application in Japan, Japanese Patent Laid-Open No. 206530/2002. The sealing member is convenient to assemble it with the sealing structure in the sliding units and less expensive in production cost. With the sealing structure for the sealing unit in FIG. 7, a sealing member 1A rich in restoring force is secured to the dustproof cover 15A to lie in a clearance that is left opened between the dustproof cover 15A and the lengthwise side wall 7A of the track rail 2. The sealing member 1A constantly closing the clearance 33 between the dustproof cover 15A and the lengthwise side wall 7A of the track rail 2 experiences any deformation of expansion/collapse, with keeping sliding engagement with the associated wing 10A that pushes its way out the sealing member 1A as a sidewise wing 10A of the slider 3A moves back and forth between the sealing member 1A and the side wall 7A. The sealing structure constructed as stated earlier is envisaged to make certain of smooth back-and-forth movement of the slider, helping improve the sealing performance at the clearance 33 and also the durability of the sealing member 1A. Moreover, the sealing member 1A is easy to place correctly it in the associated clearance 33. In the sealing structure shown in FIG. 7, other most parts and components are the same or equivalent in function with those in sealing unit of the present invention, which will be described later. To that extent, the parts and components are given the same reference characters as in the sealing unit in FIG. 3, so that the later description will be applicable.

SUMMARY OF THE INVENTION

The present invention, therefore, has as its principal object to refine the sealing structure of the sliding unit disclosed in the Japanese Patent Laid-Open No. 206530/2002. The entire concept of the present invention is to shrink the sealing structure down in size and make it simple in construction in compliance with the sliding units being generally shrinking in size. The major object of the present invention is the provision of a sliding unit in which any clearances to be closed with the sealing members are concentrated on just a limited area on the sealing unit to deal with the need to much more shrink the sliding unit. In particular, the principal object of the present invention is to provide sealing means for a sliding unit, in which at least one projection extends from a slider out of a dustproof enclosure along a clearance left open in the dustproof enclosure to allow the projection to travel back and forth along the clearance, and a sealing member of expansible cellular material is installed to close elastically the clearance, but collapse to allow the projection to move along the clearance, with keeping sliding engagement with the sealing member thereby preventing foreign materials such as dust and dirt, oil mist and so on from entering into the sliding unit and also keeping contaminants including debris, metal cuttings, oil mists and so on owing to the sliding unit itself against escape outside the sliding unit through there into a controlled atmosphere such as clean rooms, laboratories and the like where the semiconductor manufacturing machines and so on are installed.

The present invention is concerned with sealing means for a sliding unit; comprising a guide component including a track rail having a pair of side walls spacing away widthwise from each other and extending lengthwise in parallel with each other, and a slider fit between the widthwise opposing side walls for back-and-forth sliding movement; wherein the guide component is made opened upwardly to provide a clearance defined between lengthwise edges lying in sidewise opposition to each other above the slider, and sealing members of elastic cellular material exhibiting a restoring force are disposed in the guide component, with their sidewise opposing inside fronts coming in abutment against one another to close the clearance; and wherein the slider is provided thereon with a projection to hold thereon an object, which extends through between the inside fronts of the sealing members in a way moving along the clearance with deforming the sealing members in expansion/collapse fashion to constantly keep a close sliding engagement with the inside fronts of the sealing members upon a back-and-forth movement of the slider relatively of the guide component.

In an aspect of the present invention, sealing means for a sliding unit is disclosed in which the projection extends lengthwise of the slider and has forward and aft tapered ends, and a mid-portion left thick in widthwise direction. In another aspect of the present invention, sealing means for a sliding unit is disclosed in which a wear-proof slideway belt is applied on the projection of the slider, with which the sealing member comes into sliding engagement.

In another aspect of the present invention, sealing means for a sliding unit is disclosed in which there is provided a resilient member extending lengthwise of the sealing member to aid the sealing member in speedy recovery from the deformation of expansion/collapse suffered when the projection of the slider moves through the clearance. In a further another aspect of the present invention sealing means for a sliding unit is disclosed in which the sealing member is made of foamed rubber. In another aspect of the present invention sealing means for a sliding unit is disclosed in which the sealing member is coated with a protective skin. In another aspect of the present invention sealing means for a sliding unit is disclosed in which the sealing member has a slim portion made tapered towards the inside front in traverse cross-section, and just the slim portion can be much subjected to an elastic deformation to such extent that the sealing member gets deformed to a substantially quadrangular configuration in cross section as the projection of slider moves with pushing the inside front of the sealing member. In a further aspect of the present invention, sealing means for a sliding unit is disclosed in which a wear-proof slideway belt extending fore-and-aft direction of the sealing member is applied on the inside front of the sealing member with which the projection of the slider comes into sliding engagement.

In another aspect of the present invention, sealing means for a sliding unit is disclosed in which the guide component is made with an air port that is connected with an air line to either suck and expel an atmosphere existing in a space enclosed with the guide component and the sealing members out of the space through there or blow a clean air into the space through there.

In another aspect of the present invention, sealing means for a sliding unit is disclosed in which the track rail is made up of a pair of the side walls and a bottom integral with the side walls in such a way that the side walls rise along widthwise spaced edges of the bottom, thereby forming as a whole a shape of trough.

In another aspect of the present invention, sealing means for a sliding unit is disclosed in which the side walls of the track rail are provided on their widthwise opposing inner surfaces with raceway grooves while the slider is provided on sidewise opposing surfaces thereof with raceway grooves confronting the raceway grooves of the side walls to define load raceways between them, and rolling elements installed in the slider run through the load raceways defined between the confronting raceway grooves, thereby allowing the slider to move back and forth relatively to the track rail.

In another aspect of the present invention, sealing means for a sliding unit is disclosed in which the slider includes a carriage fit in between the side walls of the guide component for sliding movement, and a torque-to-thrust conversion system mounted on the carriage and comprised of a nut mating with a recirculating-ball screw shaft, and wherein the guide component includes driving means to rotate the recirculating-ball screw shaft mating with the nut in the slider.

In a further another aspect of the present invention, sealing means for a sliding unit is disclosed in which the slider has just one projection extending in fore-and-aft direction midway between the widthwise opposing side surfaces thereof, and the guide component is comprised of the track rail, a pair of first covering shells to hold the sealing members therein, one to each shell, the first covering shells being each fastened to the associated side wall, with rising above the side wall lengthwise of the side wall, and end covers attached to forward and aft ends of the track rail, one to each end. In another aspect of the present invention, sealing means for a sliding unit is disclosed in which the covering shell is composed of a covering side extending along the associated side wall, and seal supporters formed integral with the covering side to define a recess lying above the slider to open toward a counterpart that are in widthwise opposition to the covering shell, and wherein the sealing members are installed in the recesses, one to each recess.

In another aspect of the present invention, sealing means for a sliding unit is disclosed in which the slider has two projections that extend lengthwise of the slider, with being spaced widthwise apart from each other, and wherein the guide component is comprised of the track rail, the end covers fastened to the forward and aft ends of the track rail, one to each end, and a second covering shell to hold the sealing members therein, the second covering shell including a pair of covering sides fastened to the side walls of the track rail, one to each side wall, so as to lie lengthwise of the track rail above the side walls, and covering ridges disposed midway between the widthwise spaced projections and fastened at their forward and aft ends to the end covers, and the covering sides and covering ridges being each angled in towards the associated projection at the lengthwise upper edges thereof. In another aspect of the present invention, sealing means for a sliding unit is disclosed in which the covering ridges are made of either an elongated Tee or elongated angles that lie back to back with each other at their legs midway between the projections, with other legs extending in directions opposite towards their associated projections, and wherein the sealing member is made up of a sidewise outside sealing block held in the associated covering side, and a sidewise inside sealing block flanking the associated leg of the covering ridge and held in the associated covering ridge.

In another aspect of the present invention, sealing means for a sliding unit is disclosed in which there is installed a sensor in opposition to any one side of the slider to sense where the slider is. Moreover, in another aspect of the present invention, sealing means for a sliding unit is disclosed in which the sealing member is made up of a major thick portion, and a relatively slim portion reaching from the major thick portion to the projection to mainly afford the deformation of expansion/collapse of the sealing member.

In another aspect of the present invention, sealing means for a sliding unit is disclosed in which a fastener plate is attached to any surface of the sealing member, where the sealing member is mounted to the covering shell. Moreover, sealing means for a sliding unit is disclosed in which the projection has a platform to rest thereon any object including an instrument, part, member, position control table, and so on.

With the sealing structure constructed as stated earlier, the sealing members are disposed on the widthwise opposing inside surfaces of the guide component, one to each inside surface, to close the clearance left opened between the inside surfaces. Upon the back-and-forward linear movement of the slider relatively to the guide component, the projection of the slider can move between the confronting inside fronts of the sealing members in a way deforming the sealing members in expansion/collapse fashion, with keeping the close sliding engagement with the confronting fronts of the sealing members so that the sealing members keep constantly closing the clearance left open between the covering shells. With the sliding unit in which the slider has only one projection, the atmosphere inside the sliding unit is just exposed to the environment at one clearance and, thus, can be kept surely in airtight condition. By the way of contrast, the slider with two projections are effective to make certain of keeping the object on the table steady and also smooth sliding movement of the slider without subject to lean even if the object on the table is lopsided in load.

In accordance with the sealing structure discussed here, it is preferred that the projection is made up of forward and aft tapered ends and a mid-portion left thick in widthwise direction. Moreover, sealing member is preferably made up of a major thick portion fit in the recess defined with the seal supporters of the covering shell composing the guide component, and a relatively slim portion reaching from the major thick portion to the inside front. The sealing member formed as stated just above helps make sure of their natural deformation in expansion/collapse fashion with keeping good closing condition, when the projection of the slider travels in a way shoving the sealing members aside. With the sealing structure of the present invention, thus, foreign materials such as dust and dirt, and so on are kept against either entering into or coming from inside the sliding unit through the clearance between the sealing members lying on the seal supporters of the covering shells. For example, debris, metal cuttings, and so on caused owing to the back-and-forth movement of the slider are kept against scattering all around through the clearance in the clean room, which will be thus maintained in any desired cleanliness. In addition, as the foam rubber for the sealing member is made in a simple quadrangular shape in traverse cross-section, rather than any sophisticated shape and structure that might introduce costly production requirements, the sealing member devised in the present invention can be much reduced in its production cost and also is easy to apply it to any clearance left open between the sidewise opposing surfaces of the guide component.

In accordance with the sealing structure of the present invention, the sealing member has resilient member extending lengthwise on the side making a sliding contact with the projection of the slider to aid the sealing member in speedy recovery from the deformation of expansion/collapse suffered when the projection of the slide moves in a way pushing the sealing member aside. Even if the sealing member were subjected to deterioration due to aging, for instance, even when the projection of the slider were actuated after stood idle for a long period, moreover, any spring force of the resilient member would aid the sealing member to immediately restore its initial shape from the deformation of expansion/collapse, without leaving signs of the associated projection on the sealing member. Thus, it will be expected that the spring force of the resilient member works to improve the response of the sealing member to the deformation of expansion/collapse, thereby raising the close engagement of the sealing member with other surfaces to make sure of high sealing performance.

With the sliding unit with the sealing structure constructed as stated earlier, the projection extending upward above the top of the slider is to rest thereon any load or object to be carried including parts, instruments, members, and so on for production machines. The sliding unit with the sealing structure of the present invention, although limited to just a small weight in load capacity to be carried, is suitable to shrink it down to the size most conformable to parts, instruments, table and so on, which weigh less enough to be carried on, for example semiconductor manufacturing equipment, position control table and the like. The sliding unit of the present invention is most suitable to work well on the machines that need the sliding unit much less in sidewise dimension, as is the case, for example in assembling machines in which many tables have to be placed one upon another within a limited space. Further, the sliding unit according to the second embodiment of the present invention has two projections extending upwards above the slider, which tolerate the sliding unit bearing the more massive load than in just one projection. Moreover, the sliding unit of the present invention, because the slider does not have any wings extending sidewise out of the sliding unit as in the prior sliding unit, is made much slim in widthwise dimension, compared with any types of the prior sliding unit.

The sealing member of the present invention is made in a quite simple shape, for example a substantially trapezoidal shape composed of a thick portion of quadrilateral in cross section and a tapered slim portion. This means that the sealing members are most easily installed in the recesses between the seal supporters of the covering shells, one to each recess, with their confronting inside fronts extending towards each other out of the seal supporters into abutment against one another. Moreover, the sealing member of such simple shape as stated earlier is infinitesimal in the likelihood of causing any irregular deformation in itself, helping realize improvement in sealing performance, with even inexpensive in production cost.

With the sealing structure of the present invention, it is said that the atmosphere inside the sliding unit enclosed with the guide component and the covering shells proves substantially airtight, except that it is exposed to the environment at just a tiny area where the projection extends outside through between the lengthwise fronts of the sealing members coming abutment against each other. Thus, the sliding unit is only needed to experience a minor amount of suction even when air existing inside the sliding unit has to be sucked out to expel debris, metal cuttings, oil mist and so on owing to the sliding unit itself. Thus, it is said that the sliding unit of the present invention is so constructed as able to easily provide the high cleanness-assured working environment. That is to say, the sealing structure of the present invention makes certain of keeping the contaminants including debris, metal cuttings, oil mist and so on, which might occur owing to the sliding unit itself, against scattering outside the sliding unit and also most reducing the occurrence of the debris ever realized. Consequently the sealing structure of the present invention serves good sealing function and there is no occurrence of any obstacle in the clean room where, especially, the semiconductor manufacturing machines are installed. Further, the sealing construction using the sealing member of porous substance such as foam rubber is effective to protect the sliding unit against an invasion of foreign matter such as dust and dirt through the clearance in the sliding unit.

In case where the sealing structure of the present invention is availed in a bad environment full of a cloud of dust, it will be appreciated to force a clean air in the reverse direction into the inside of the sliding unit through the air port that has been originally envisaged to expel the contaminated air out of the sliding unit, blowing the clean air out through the clearances or gaps in the sliding unit, thereby keeping the foreign matter such as dirt and dust against entering inside the sliding unit, which might otherwise ruin the sliding ability of the sliding unit in itself, and making sure of increasing the durability of the sliding unit. Usage as stated just above is most effective in the worst-working environment including woodworking sites full of sawdust, working shops to cut, grind and polish ceramics, and so on.

The above and other related objects and features of the present invention will be more apparent to those skilled in the art from a reading of the following description of the disclosure found in the accompanying drawings and the novelty thereof pointed out in the appended claims.

DETAILED DESCRIPTION OF THE PREFERRED EMBODIMENTS

Referring now in detail to the accompanying drawings, a sliding unit having sealing means according to the present invention will be explained below.

Figure 7:
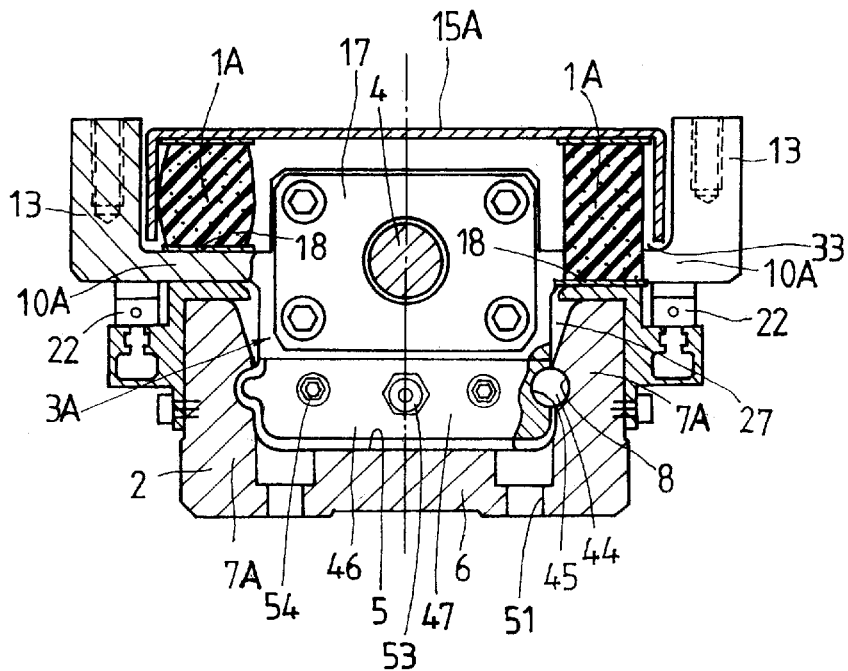
FIG. 7 is a traverse cross-section to show prior sealing unit with sealing means, with taken on a plane corresponding to the line I-I in FIG. 1.
Figure 8:
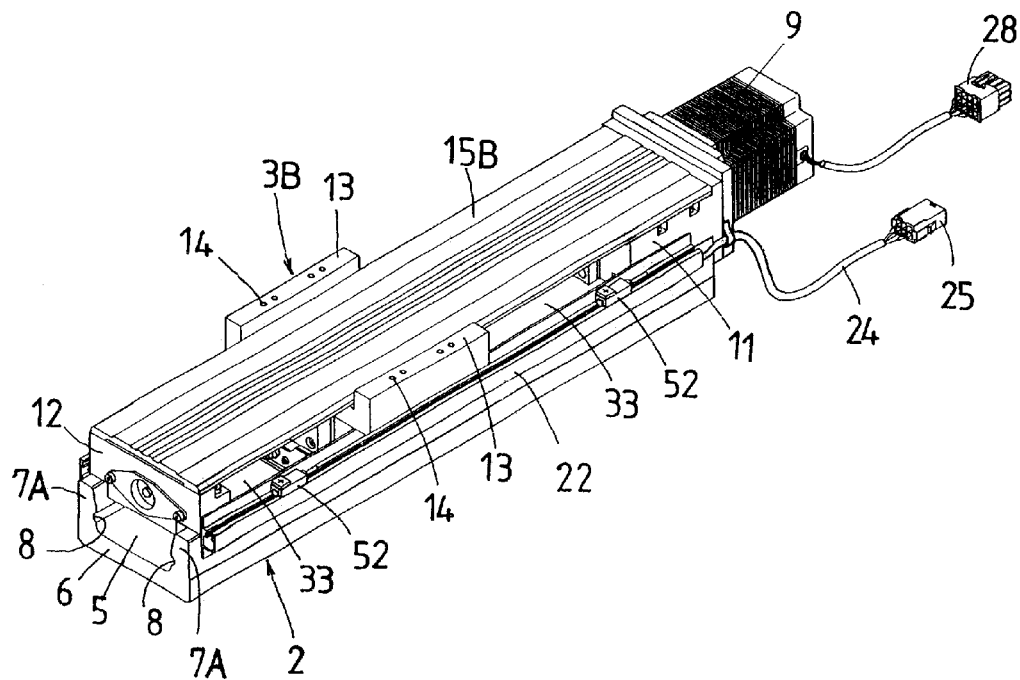
FIG. 8 is a perspective view showing a conventional sliding unit.
Figure 9:
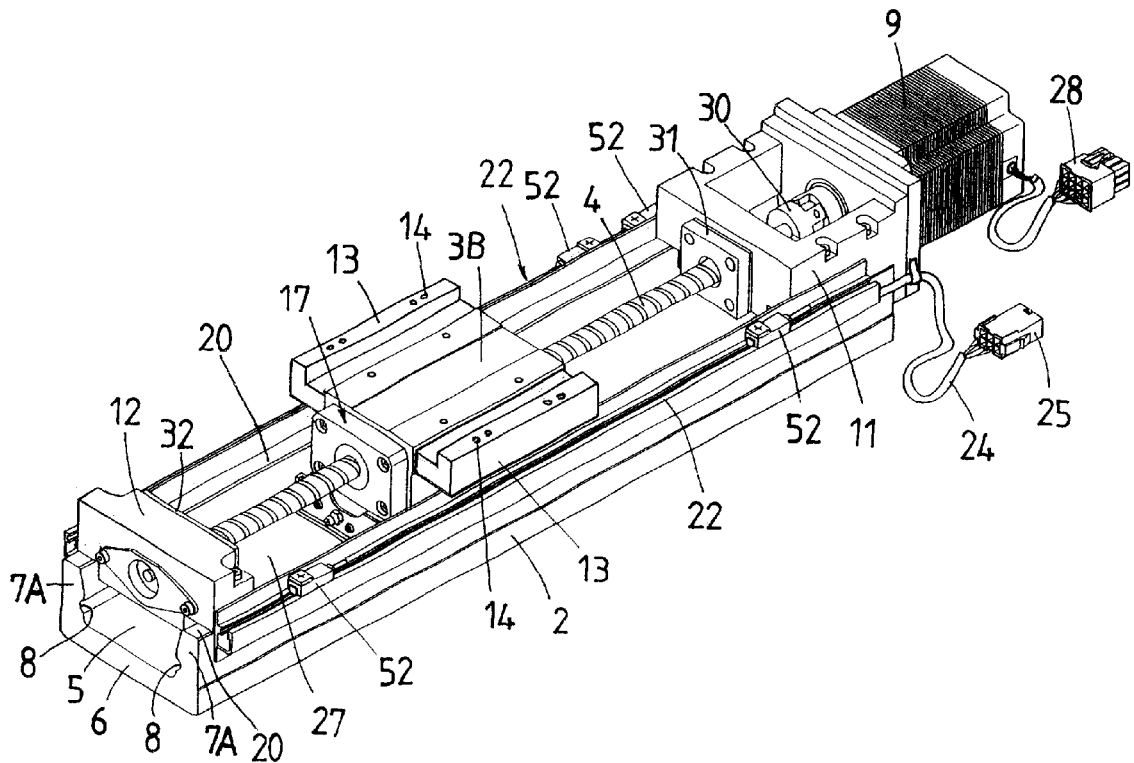
FIG. 9 is another perspective view of the conventional sliding unit of FIG. 8, but in which a dustproof cover is shown as being removed.

The sliding unit incorporated with the sealing means of the present invention will be used in not only a diversity of machinery such as semiconductor manufacturing apparatus, machine tools, assembling apparatus, testing instruments, position control tables, sliding tables and so on, which are needed to work in any controlled atmosphere including clean rooms, laboratories and the like, but also other types of machines that is expected to work in an environment contaminated with dust and dirt. In the sliding unit according to the present invention shown in FIGS. 1 to 6, many parts and components substantially equivalent or same in function with those in the prior sliding units stated earlier are given the same reference characters as in FIGS. 7 to 9, so that the earlier description will be applicable.

Figure 1:
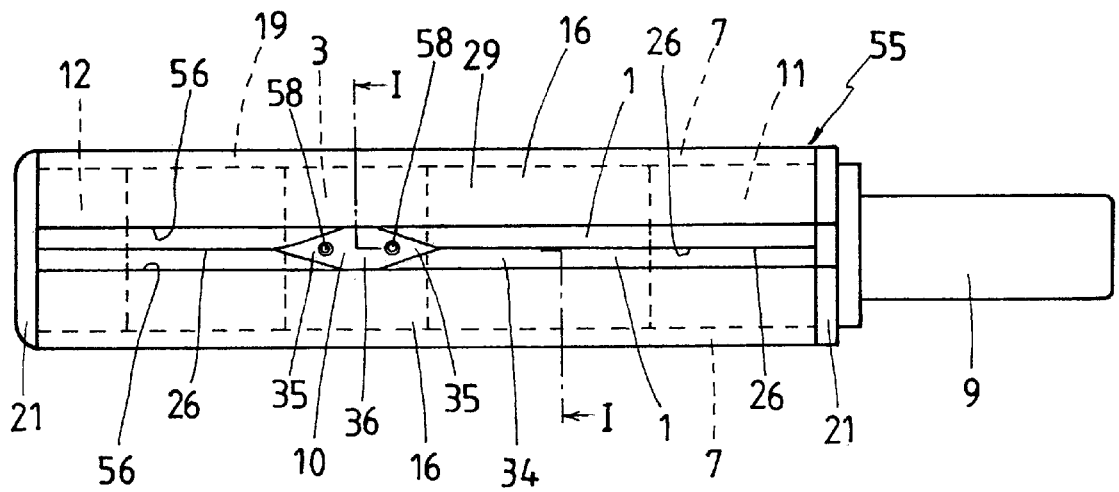
FIG. 1 is a front elevation view showing a preferred embodiment of a sliding unit provided therein with sealing means according to the present invention.
Figure 2:
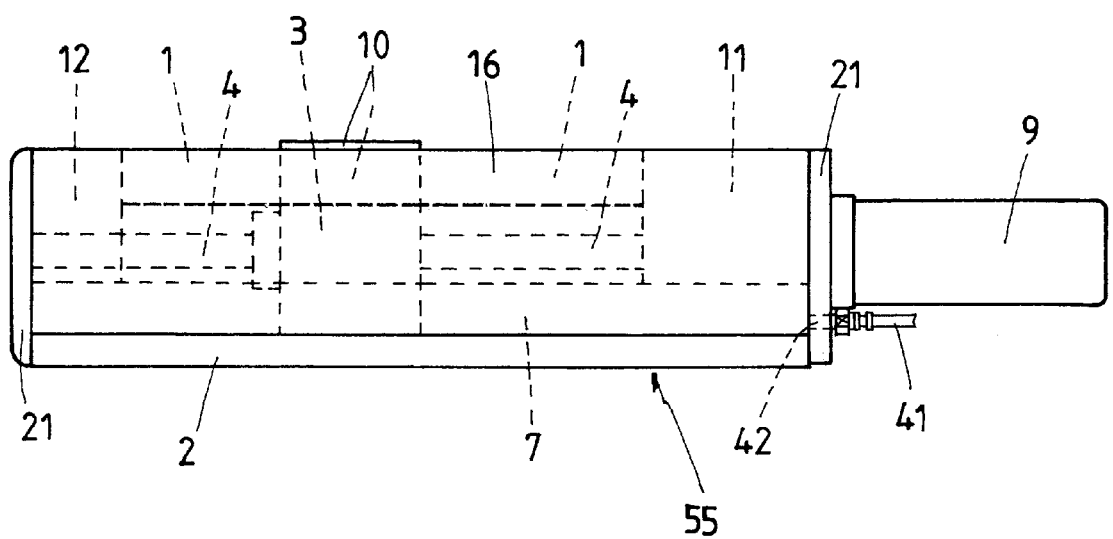
FIG. 2 is a side elevation of the sliding unit shown in FIG. 1.
Figure 3:
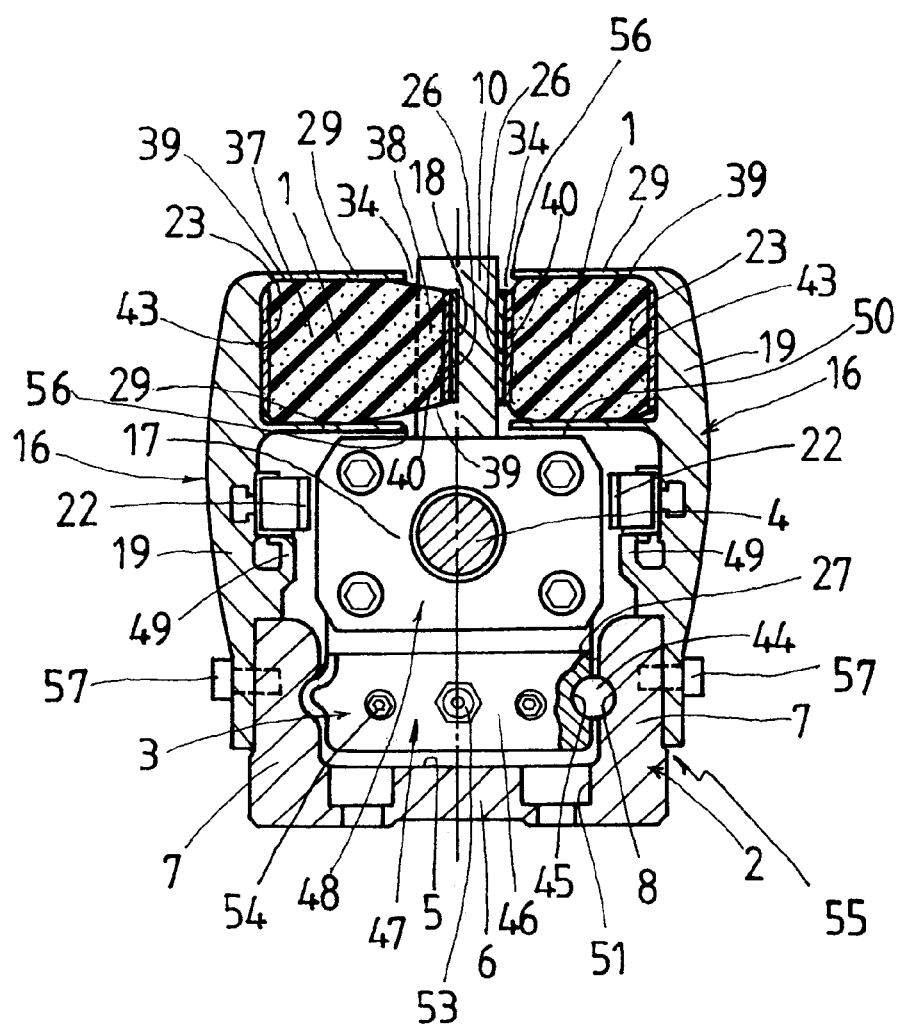
FIG. 3 is a traverse cross-section of the sealing means in the sliding unit in FIG. 1 taken on a plane lying on the line I-I in FIG. 1.

Referring first to FIGS. 1 to 3, there is illustrated a preferred embodiment of sealing means for a sliding unit according to the present invention.

The sliding unit having incorporated with the sealing means of the first embodiment is mainly comprised of a guide component 55 including a track rail 2 having a pair of side walls 7 spacing away widthwise from each other and extending lengthwise in parallel with each other, and a slider 3 fit between the widthwise opposing side walls 7 for back-and-forth sliding movement. The guide component 55 is made opened upwardly to provide a clearance 34 defined between lengthwise edges 56. Sealing members 1 of elastic cellular material exhibiting a restoring force are disposed above the slider 3, with their sidewise opposing inside fronts 26 coming in elastic abutment against one another to close the clearance 34 left opened between the widthwise opposite edges 56. Moreover, the slider 3 is provided thereon with a projection 10 to hold thereon an object, which extends through between the inside fronts 26 of the sealing members 1 in a way shoving the inside fronts 26 aside. The projection 10 is utilized to hold any object including instruments, parts, members, position control tables, and so on installed in various machinery including, for example semiconductor manufacturing equipments, machine tools, industrial robots and the like. To this end, the projection 10 can be made with, for example, either a bolt hole 58 as shown FIG. 1 or a flange to fasten a mounting base on which any object is attached. With the sealing structure for the sealing means discussed here, especially, the sealing members 1 are disposed with the inside fronts 26 thereof coming in elastic abutment against one another. Upon the back-and-forth movement of slider 3 relatively of the guide component 55, the projection 10 can travel in a way pushing the inside fronts 26 away from each other, with keeping constantly the close sliding engagement with the inside fronts 26. Thus, the sealing members 1 can experience deformation of expansion/collapse, with keeping isolating inside the sliding means at any given time.

The guide component 55, as shown in FIG. 3, is made up of a lower half of the track rail 2 having the widthwise opposing side walls 7 made with guide raceway grooves 8, and an upper half of a covering shell 16 having the lengthwise edge 56. Although not shown, it will be appreciated that the guide component 55 may be made in a unitary part in which the track rail 2 formed with a pair of side walls 7 and a bottom 6 integral with the side walls 7 is, for example, mold or cast integrally with the covering shells 16. In the illustration in FIG. 3, the covering shall 15 is fastened to the associated side wall 7 with bolts 57, with rising above the side wall 7 lengthwise of the side wall 7. The covering shell 16 is composed of a covering side 19 extending along the side wall 7, and seal supporters 29 formed integral with the covering side 19 to define a recess 23 lying over an upper surface 50 of the slider 3 and made open toward the counterpart that faces widthwise the covering shell 16.

The sealing structure of the present invention will discuss about the construction in which the guide component 55 is made up of the track rail 2 and the covering shell 16, which has been made separately from one another then, followed by assemblage. The sealing structure is mainly comprised of the guide component 55 having a pair of lengthwise side walls 7 that are spaced sidewise apart from one another, and the slider 3 fit in between the side walls 7 for back-and-forth linear movement. The guide component 55 is further made up of the track rail 2 and the covering shells 16. The track rail 2 is fastened to a base or machine bed with bolts that fit in bolt holes 51. The covering shells 16 each include the covering side 19 lying lengthwise along the associated side wall 7, and the seal supporters 29 formed integral with the covering side 19 to define the recess 23 lying over the associated upper surface 50 of the slider 3 and made open toward the counterpart that faces widthwise the covering shell 16. The covering sides 16 are each fastened to the associated side wall 7 of the track rail 2 in such a way rising above the side wall 7. The sealing members 1 fit in between the upper and lower seal supporters 29 in widthwise opposition to one another.

The sealing members 1 made of elastic cellular material rich in restoring force fit in the sidewise opposing recesses 23, one in each recess, in such a way coming into abutment against each other on their opposing fronts 26 to close a clearance 34 left opened between sidewise opposing inside tips of the seal supporters 29. The slider 2 has the projection 10 extending through between the inside fronts 26 of the sealing members 1. As the slider 3 move back and forth along the track rail 2, the projection 10 move in a way applying the deformation of expansion/collapse with keeping coming in sliding engagement with the inside fronts 26 of the sealing members 1.

As shown in FIG. 1, the projection 10 of the slider 3 is made up of forward and aft tapered ends 35 and a midportion 36 left thick in widthwise direction. The sealing member 1 is made up of a major thick portion 37 fit in the recess 23 defined between the seal supporters 29, and a relatively slim portion 38 reaching from the major thick portion 37 to the inside front 26. The relatively slim portion 38 can mainly afford the deformation of expansion/collapse of the sealing member 1. Thus, the sealing members 1 is each designed just the slim portion 38 can be much subjected to the elastic deformation to the extent that the sealing member 1 as a whole gets deformed to a substantially quadrangular configuration in cross section, as the projection 10 of slider 3 moves with pushing the inside fronts 26 of the sealing members 1. In the sealing member 1, moreover, there is provided a resilient member 40 extending lengthwise of the sealing member 1 to aid the sealing member 1 in speedy recovery from the deformation of expansion/collapse suffered when the projection 10 of the slider 3 forces the sealing member 1 aside. The sealing member 1 is made of foamed rubber, whether coated with protective skin or not.

A fastener plate 43 is attached to the sealing member 1 to make certain of securely holding the sealing member 1 in the recess 23 between the associated seal supporters 29. On the inside front of the sealing member 1 with which the projection 10 of the slider 3 comes into sliding engagement, there is provided a wear-proof slideway belt 18 extending fore-and-aft direction of the sealing member 1. As an alternative, although not shown, the wear-proof slideway belt may be applied on the projection 10 of the slider 3, with which the associated sealing member 1 comes into sliding engagement.

The track rail 2 is made up of a pair of side walls 7 and a bottom 6 integral with the side walls 7 so as to form a channel opened on one lengthwise side between the sidewise opposing side walls 7. With the sliding unit constructed as stated earlier, the track rail 2 is made with an air port 42 to be connected with an air line 41 to suck in an atmosphere existing in a space that is enclosed with the track rail 2, a pair of covering shells 16 and a pair of sealing members 1. An end cover 21 with any threaded port 42 is secured with some screws on any one of the forward and aft ends of the track rail 2. The air line 41 is connected to the port 42 to expel the contaminants including debris, metal cuttings, oil mist and so on, which might occur in the recess 5 within the track rail 2, outside any enclosure such as a clean room. By the way of contrast, it will be appreciated to force a clean air in the reverse direction into the space inside the track rail 2 through the air port 42 that has been originally intended to expel the contaminated air out of the track rail 2, blowing the clean air out through the clearances or gaps in the sliding unit, thereby keeping the inside of the sliding unit against the contamination with the foreign matter such as dirt and dust.

Sensor rails 22 are disposed on the covering sides 19 of the covering shells 16, one to each side, in opposition to the sides of the slider 3. On each sensor rails 22 there are installed limit sensor at any preselected places to sense where the slider 3 is. The track rail 2, as made up of the side walls 7 widthwise spaced apart from one another and integrally connected through the bottom 9 along their lengthwise lower edges, is made in a channel opened upwards at 27. With the sliding unit constructed as stated above, the recess 5 inside the track rail 2 is plugged at one end of the forward and aft ends thereof with the bearing member 12 for the recirculating-ball screw shaft and the end cover 21, while at another end with the end cover 21 and the bearing member 11 near the motor.

According to the sliding unit of the present invention, the elongated track rail 2 provides the recess 5 of an U-shape configuration in traverse cross-section thereof, in which the slider 3 is accommodated for linear movement to any desired position along raceways made on sidewise opposing inside surfaces of the track rail 2. Smooth back-and-forth movement of the slider 3 in the sliding unit of the present invention can get ensured by virtue of rolling elements 44 that are allowed to run through load raceways defined between raceway grooves 45 on widthwise opposite sides of the slider 3 and raceway grooves 8 on the sidewise opposing inside surfaces of the side walls 7. On an inside surface of the covering shell 16 secured on the associated side wall 7 of the track rail 2, there is provided a bracket 49 on which the sensor rail 22 lies, which has two limit sensors 23 to sense where the slider 3 is at any preselected places spaced apart away from each other.

The slider 3 includes a carriage 47 fit in between the side walls 7 of the track rail 2 for sliding movement, and a torque-to-thrust conversion system 48 mounted on the carriage 47 and comprised of a nut 17 mating with the recirculating-ball screw shaft 4. With the sliding unit discussed here, any driving means is installed in the track rail 2 to rotate the recirculating-ball screw shaft 4 mating with the nut 17 in the slider 3. The nut 17 is mounted to the slider 3 while the recirculating-ball screw shaft 4 is supported for rotation with the bearing members 11, 12, refer to FIG. 9, which are secured to the track rail 2. On any one of forward and aft ends of the track rail 2 there is attached a bracket to which is mounted the motor 9. Thus, rotating the recirculating-ball screw shaft 4, either clockwise or counterclockwise, by means of the motor 9 causes the slider 3 to move back and forward along the track rail 2. Besides, the carriage 47 of the slider 3 has mounted with an end seal 46 and grease nipple 53 by means of any screws 54.

The sealing member 1 can adhere to inside surfaces of the recess 23 between the seal supporters 29 of the covering shell 16 through, for example, the fastener plate 43 attached to any one face of the sealing member 1. The projection 10 of the slider 3 is constructed to allow the sealing member 1 to experience the deformation of expansion/collapse with keeping constantly the closely sliding engagement with the associated surface of the projection 10 of the slider 3 when the projection 10 travels between sidewise opposite slideway belts 18 each of which is attached on the sidewise inside exposed front of the associated sealing member 1. Thus, the projection 10 can move lengthwise across the clearance 34 in a sliding way, with keeping the interior of the sliding unit close against the environment. The projection 10 constantly coming into sliding contact with the sealing member 1 of foam rubber is formed to have the forward and aft tapered ends 35, by virtue of which the foam rubber-made sealing member 1 may be controlled to smoothly experience the deformation of expansion/collapse fashion.

The sealing member 1 is made of highly flexible, cellular material exhibiting a satisfactory restoring force because of its own elasticity. Moreover, the sealing member 1 is made in a construction that is easy for production and handling thereof, making sure of long-lasting service life even under repeated expansion/collapse, and also excellent in sealing performance. It is to be noted that the sealing member 1 is formed in the configuration of substantially quadrilateral such as rectangle, square and so on in traverse cross-section. The sealing member 1 is also made of any material that may be expansible and collapsible with keeping substantially the initial quadrilateral when the projection 10 of the slider 3 pushes the sealing member 1 aside. It is, for example, preferred that the sealing member 1 is made of any foam rubber of cellular structure containing small closed or cells, which makes sure of the sealing performance to certainly prevent the dust, debris and so on from entering into and coming from inside the sliding unit. In some cases, the sealing member 1 may be coated with any protective skin 39.

Foam rubber for the sealing member 1 is highly flexible, cellular rubber exhibiting a sufficient restoring force because of its own elasticity, for example a latex sponge that is made from any latex compounded with various ingredients such as sulfur, vulcanization accelerator, antioxidant, blowing agent and so on, and whipped into a froth. The resulting product is molded with any coagulating agent and vulcanized with heating steam or hot water, followed by rinsing and drying. Although but the sealing member 1 may be coated with any moisture-proof skin, it will be preferable to leave the overall surface thereof uncovered or bare because there is no possibility of any cracking, which might happen in the skin owing to the repeated expansion/collapse. The sealing member 1 of the foam rubber stated earlier has proved effective in sealing the clearance 34.

On any of the sides, the top and the bottom of the foam rubber-made sealing member 1, the fastener plate 43 detachable to and from the covering shell 16 is lengthwise applied using either any pressure sensitive adhesive double-coated tape or any adhesive. On the sealing members 1 at their fronts exposed to the clearance 34, the slideway belts 18 are fastened using either any pressure sensitive adhesive double-coated tape or any adhesive. The slideway belt 18, since coming into sliding engagement with the projection 10 of the slider 3, is preferably made of any substance less in raising dust and dirt. The fastener plate 43 is made of, for example a stainless steel sheet. As an alternative, the fastener plate 43 may be made with bolt holes positioned at lengthwise regular intervals, which are used to fasten the sealing member 1 to the covering shell 16.

For the slideway belt 18 fastened lengthwise to any of the top, the bottom and/or the sides of the foam rubber-made sealing member 1, a wafer conveying belt used commonly in the clean rooms is available, which is made of any polyester hard to give rise to cuttings owing to wear. Accordingly, the slideway belt 18 is made of any polyester of polyester resins, polyester fibers and so on at least at a specified surface thereof coming into sliding engagement with the associated projection 10 of the slider 3. The slideway belt, although not shown, may be also attached to the projection 10 of the slider 3, thereby much more reducing the incidence of debris. Moreover, it is preferred that the slideway belt 18 is made somewhat greater in width than the foam rubber of the sealing member 1 to such an extent that the foam rubber of the sealing member 1, irrespective of its expansion/collapse, can't bulge out sideward beyond the slideway belt 18, thus never coming into sliding engagement with the confronting surface of the associated projection 10 of the slider 3. On the surface of the projection 10 of the slider 3 coming into sliding engagement with the slideway belt 18, there is preferably attached another wear-proof slideway belt to improve wear resistance, thereby much reducing the occurrence of debris because of wear.

Figure 4:
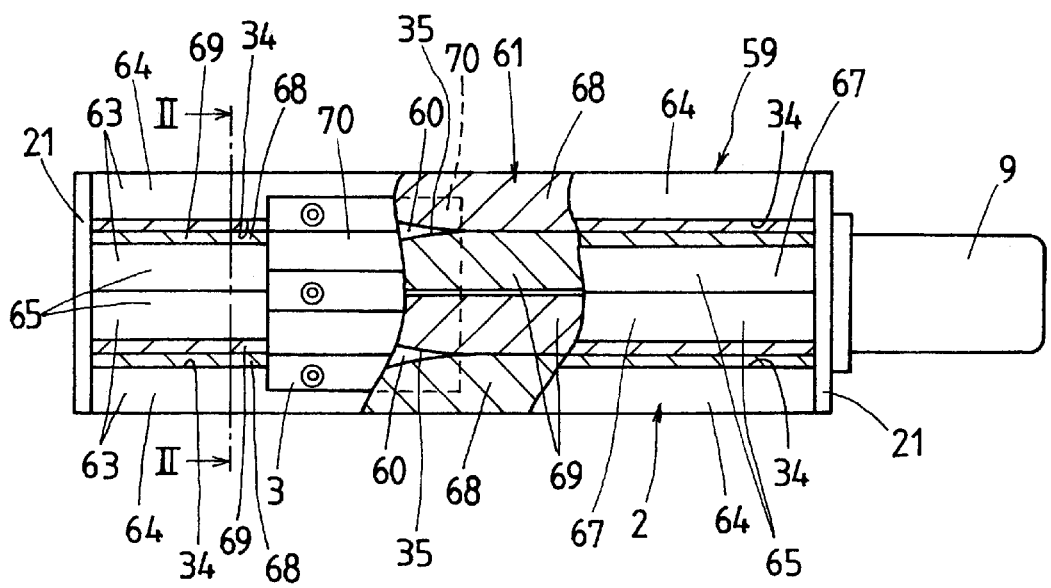
FIG. 4 is a front elevation view, partly broken away, showing another embodiment of a sliding unit provided therein with sealing means according to the present invention.
Figure 5:
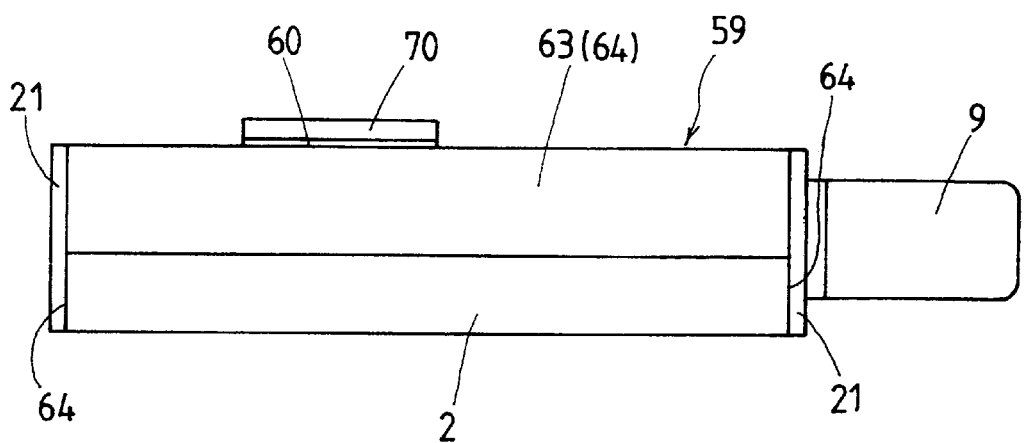
FIG. 5 is a side elevation of the sliding unit shown in FIG. 4.
Figure 6:
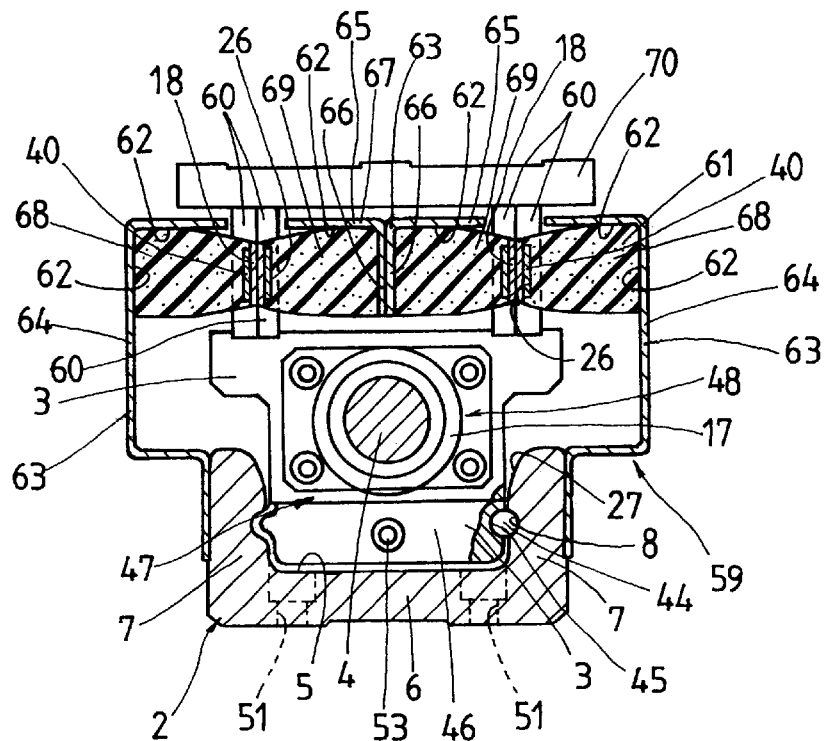
FIG. 6 is a traverse cross-section of the sealing means in the sliding unit in FIG. 4 taken on a plane lying on the line II-II in FIG. 4.

Referring next to FIGS. 4 to 6, there is shown a second embodiment of the sealing structure for the sliding unit according to the present invention. This second embodiment, when compared to the first embodiment stated earlier, illustrates the slider 3 having two projections 10, while the slider 3 in the first embodiment has just one projection 10. Correspondingly, the guide component 59 of the second embodiment composed of a sealing member 61 and a covering shell 63 including therein seal supporters 62 is different in construction from the guide component 55 explained earlier in the first embodiment. Most of other parts and components in the second embodiment stated later are the same previously described in the first embodiment stated earlier. To that extent, the parts and components in the second embodiment shown in FIGS. 4 to 6 will be given the same reference characters as in the first embodiment in FIGS. 1 to 3, so that the previous explanation will be applicable.

With the sliding unit having the sealing structure according to the second embodiment of the present invention, the slider 3 has two projections 60 that extend lengthwise of the slider 3, with being spaced widthwise apart from each other. The projection 60 is formed in the same design as the first projection 10 stated earlier. On the tops of the projections 60 there is rested a table 70 on which any object such as instruments and so on is held. It will be understood that the two projections 60 are effective to keep the object on the table 70 steady and also rest more massive object than in the first embodiment. The guide component 59 is comprised of the track rail 2 with the side walls 7, the end covers 21 fastened to the forward and aft ends of the track rail 2, one to each end, and the covering shells 63 to hold the sealing member 61 therein. Moreover, the covering shells 63 include covering sides 64 fastened to the side walls 7 of the track rail 2, one to each side wall, so as to lie lengthwise of the track rail 2 above the side walls 7, and covering ridges 65 disposed midway between the widthwise spaced projections 10 and fastened at their forward and aft ends to the end covers. The covering sides 64 and covering ridges 65 are each angled in towards the associated projection 60 at their lengthwise upper edges.

Between any sidewise opposing covering side 64 and ridge 65 of the covering shells 63 constructed as stated just earlier, there is left opened the lengthwise clearance 34 along which associated projection 60 is allowed to run through there. Another paired covering side 64 and ridge 65 of the covering shells 63 are also disposed in the same fashion as in the first paired covering side 64 and ridge 65, thereby to form another lengthwise clearance 34 where another projection 60 run through there. The covering ridges 65 are made of elongated angles that lie back to back with each other at their legs or webs 66 midway between the projections 60, with other legs 67 extending in directions opposite towards their associated projections 60. As an alternative, the covering ridge 65, although not shown, may be made of an elongated Tee. The covering ridge 65 of either angles or Tee is so much high in stiffness that the covering shells are less subject to deflection that might occur when the projections 60 of the slider 3 moves with pushing the sealing member 61 aside. Moreover, the covering ridge 65 of the type illustrated here helps makes sure of providing the inside surface where the sealing member 61 are secured, which is large enough to install securely the sealing member 61 thereby ensure the smooth sliding movement of the projections 60 on the slider 3.

Moreover, the sealing member 61 is made up of a sidewise outside sealing block 68 held in the associated covering sides 64, and a sidewise inside sealing block 69 flanking the associated web 66 and held in the associated covering ridge 65. Both the sealing blocks 68 and 69 of the sealing member 61 are made substantially same in their securing surfaces to the covering shells 63 and sliding surface with the projections 60 as in the sealing member 1 in the first embodiment.

While the present invention has been disclosed in connection with the preferred embodiments thereof, it should be understood that other embodiments may be fall within the spirit and scope of the invention, as defined by the following claims.

What is claimed is:

1. Sealing means for a sliding unit; comprising a guide component including a track rail having a pair of side walls spacing away widthwise from each other and extending lengthwise in parallel with each other, and a slider fit between the widthwise opposing side walls for back-and-forth sliding movement;

wherein the guide component is made opened upwardly to provide a clearance defined between lengthwise edges lying in sidewise opposition to each other above the slider, and sealing members of elastic cellular material exhibiting a restoring force are disposed in the guide component, with their sidewise opposing inside fronts coming in abutment against one another to close the clearance; and wherein the slider is provided thereon with a projection to hold thereon an object, which extends through between the inside fronts of the sealing members in a way moving along the clearance with deforming the sealing members in expansion/collapse fashion to constantly keep a close sliding engagement with the inside fronts of the sealing members upon a back-and-forth movement of the slider relatively of the guide component.

2. Sealing means for a sliding unit, constructed as defined in claim 1 wherein the projection extends lengthwise of the slider and has forward and aft tapered ends, and a mid-portion left thick in widthwise direction.

3. Sealing means for a sliding unit, constructed as defined in claim 1 wherein there is provided a resilient member extending lengthwise of the sealing member to aid the sealing member in speedy recovery from the deformation of expansion/collapse suffered when the projection of the slider moves through the clearance.

4. Sealing means for a sliding unit, constructed as defined in claim 1 wherein the sealing member is made of foamed rubber.

5. Sealing means for a sliding unit, constructed as defined in claim 4 wherein the sealing member is coated with a protective skin.

6. Sealing means for a sliding unit, constructed as defined in claim 1 wherein the sealing member has a slim portion made tapered towards the inside front in traverse cross-section, and just the slim portion can be much subjected to an elastic deformation to such extent that the sealing member gets deformed to a substantially quadrangular configuration in cross section as the projection of slider moves with pushing the inside front of the sealing member.

7. Sealing means for a sliding unit, constructed as defined in claim 1 wherein a wear-proof slideway belt extending fore-and-aft direction of the sealing member is applied on the inside front of the sealing member with which the projection of the slider comes into sliding engagement.

8. Sealing means for a sliding unit, constructed as defined in claim 1 wherein a wear-proof slideway belt is applied on the projection of the slider, with which the sealing member comes into sliding engagement.

9. Sealing means for a sliding unit, constructed as defined in claim 1 wherein the guide component is made with an air port that is connected with an air line through which an atmosphere existing in a space enclosed with the guide component and the sealing members is sucked and expelled out of the space.

10. Sealing means for a sliding unit, constructed as defined in claim 1 wherein the guide component is made with an air port that is connected with an air line through which a clean air is forced into a space enclosed with the guide component and the sealing members.

11. Sealing means for a sliding unit, constructed as defined in claim 1 wherein the track rail is made up of a pair of the side walls and a bottom integral with the side walls in such a way that the side walls rise along widthwise spaced edges of the bottom, thereby forming as a whole a shape of trough.

12. Sealing means for a sliding unit, constructed as defined in claim 1 wherein the side walls of the track rail are provided on their widthwise opposing inner surfaces with raceway grooves while the slider is provided on sidewise opposing surfaces thereof with raceway grooves confronting the raceway grooves of the side walls to define load raceways between them, and rolling elements installed in the slider run through the load raceways defined between the confronting raceway grooves, thereby allowing the slider to move back and forth relatively to the track rail.

13. Sealing means for a sliding unit, constructed as defined in claim 1 wherein the slider includes a carriage fit in between the side walls of the guide component for sliding movement, and a torque-to-thrust conversion system mounted on the carriage and comprised of a nut mating with a recirculating-ball screw shaft, and wherein the guide component includes driving means to rotate the recirculating-ball screw shaft mating with the nut in the slider.

14. Sealing means for a sliding unit, constructed as defined in claim 1 wherein the slider has just one projection extending in fore-and-aft direction midway between the widthwise opposing side surfaces thereof, and the guide component is comprised of the track rail, a pair of first covering shells to hold the sealing members therein, one to each shell, the first covering shells being each fastened to the associated side wall, with rising above the side wall lengthwise of the side wall, and end covers attached to forward and aft ends of the track rail, one to each end.

15. Sealing means for a sliding unit, constructed as defined in claim 14 wherein the covering shell is composed of a covering side extending along the associated side wall, and seal supporters formed integral with the covering side to define a recess lying above the slider to open toward a counterpart that are in widthwise opposition to the covering shell, and wherein the sealing members are installed in the recesses, one to each recess.

16. Sealing means for a sliding unit, constructed as defined in claim 1 wherein the slider has two projections that extend lengthwise of the slider, with being spaced widthwise apart from each other, and wherein the guide component is comprised of the track rail, the end covers fastened to the forward and aft ends of the track rail, one to each end, and a second covering shell to hold the sealing members therein, the covering shell including a pair of covering sides fastened to the side walls of the track rail, one to each side wall, so as to lie lengthwise of the track rail above the side walls, and covering ridges disposed midway between the widthwise spaced projections and fastened at their forward and aft ends to the end covers, and the covering sides and covering ridges being each angled in towards the associated projection at the lengthwise upper edges thereof.

17. Sealing means for a sliding unit, constructed as defined in claim 16 wherein the covering ridges are made of either an elongated Tee or elongated angles that lie back to back with each other at their legs midway between the projections, with other legs extending in directions opposite towards their associated projections, and wherein the sealing member is made up of a sidewise outside sealing block held in the associated covering side, and a sidewise inside sealing block flanking the associated leg of the covering ridge and held in the associated covering ridge.

18. Sealing means for a sliding unit, constructed as defined in claim 1 wherein there is installed a sensor in opposition to any one side of the slider to sense where the slider is.

19. Sealing means for a sliding unit, constructed as defined in claim 1 wherein the sealing member is made up of a major thick portion, and a relatively slim portion reaching from the major thick portion to the projection to mainly afford the deformation of expansion/collapse of the sealing member.

20. Sealing means for a sliding unit, constructed as defined in claim 1 wherein a fastener plate is attached to any surface of the sealing member, where the sealing member is mounted to the covering shell.

21. Sealing means for a sliding unit, constructed as defined in claim 1 wherein the projection has a platform to rest thereon any object including an instrument, part, member, position control table, and so on.

* * * * *